United States Patent
Sawasaki et al.

(10) Patent No.: US 7,450,212 B2
(45) Date of Patent: Nov. 11, 2008

(54) LIQUID CRYSTAL DISPLAY HAVING A LOWER DENSITY OF SPACERS AT THE PERIPHERY THAN AT THE CENTER OF THE DISPLAY AREA TO PROVIDE INCREASED COMPRESSION AT THE CENTER

(75) Inventors: Manabu Sawasaki, Kawasaki (JP); Tetsuya Fujikawa, Kawasaki (JP)

(73) Assignees: Fujitsu Limited, Kawasaki (JP); AU Optronics Corporation (TW)

( * ) Notice: Subject to any disclaimer, the term of this patent is extended or adjusted under 35 U.S.C. 154(b) by 347 days.

(21) Appl. No.: 11/059,871

(22) Filed: Feb. 17, 2005

(65) Prior Publication Data
US 2006/0055863 A1 Mar. 16, 2006

(30) Foreign Application Priority Data
Sep. 16, 2004 (JP) ............... 2004-269507

(51) Int. Cl.
*G02F 1/1339* (2006.01)
(52) U.S. Cl. ..................................... 349/155
(58) Field of Classification Search .......... 349/155–157
See application file for complete search history.

(56) References Cited

U.S. PATENT DOCUMENTS

| | | | |
|---|---|---|---|
| 6,292,249 B1 * | 9/2001 | Kane et al. ............ | 349/155 |
| 6,331,881 B1 * | 12/2001 | Hatano et al. ........... | 349/86 |
| 6,445,437 B1 * | 9/2002 | Miyazaki et al. .......... | 349/156 |
| 7,088,418 B1 * | 8/2006 | Yamashita et al. ......... | 349/153 |
| 7,113,249 B2 * | 9/2006 | Honda et al. ............. | 349/157 |
| 2001/0026347 A1 | 10/2001 | Sawasaki et al. | |
| 2002/0075443 A1 | 6/2002 | Shimizu et al. | |
| 2003/0025868 A1 * | 2/2003 | Hiroshima et al. ........ | 349/156 |
| 2003/0048403 A1 * | 3/2003 | Satoh ................. | 349/156 |
| 2004/0114087 A1 | 6/2004 | Cho et al. | |
| 2005/0099577 A1 * | 5/2005 | Lee et al. .............. | 349/155 |

FOREIGN PATENT DOCUMENTS

CN 1497299 A 5/2004

(Continued)

*Primary Examiner*—David C. Nelms
*Assistant Examiner*—John Heymaqn
(74) *Attorney, Agent, or Firm*—Greer, Burns & Crain, Ltd.

(57) ABSTRACT

The invention relates to a substrate for a liquid crystal display used as a display portion of an electronic apparatus and a liquid crystal display having the same and provides a substrate for a liquid crystal display which allows high display quality to be achieved and a liquid crystal display having the same. The substrate has a TFT substrate and a CF substrate provided opposite to each other, pillar spacers formed on the CF substrate to maintain a cell gap between the substrates, a region α which is located in the neighborhood of the center of a display area and in which the pillar spacers are compressed in a first amount of compressive displacement when a predetermined pressure in a direction perpendicular to a substrate surface is applied, and a region β which is located in the neighborhood of a picture-frame area outside the above region α and in which the pillar spacers are compressed in a second amount of compressive displacement greater than the first amount of compressive displacement.

9 Claims, 10 Drawing Sheets

FOREIGN PATENT DOCUMENTS

| | | |
|---|---|---|
| JP | 2000-292797 | 10/2000 |
| JP | 2002-182220 | 6/2002 |
| JP | 2003-084289 | 3/2003 |
| JP | 2004-198847 | 7/2004 |
| KR | 2001-0083106 | 8/2001 |

* cited by examiner

LIQUID CRYSTAL DISPLAY HAVING A LOWER DENSITY OF SPACERS AT THE PERIPHERY THAN AT THE CENTER OF THE DISPLAY AREA TO PROVIDE INCREASED COMPRESSION AT THE CENTER

BACKGROUND OF THE INVENTION

1. Field of the Invention

The present invention relates to a substrate for a liquid crystal display used in a display section of an electronic apparatus and a liquid crystal display having the same.

2. Description of the Related Art

In general, a liquid crystal display has two substrates each having transparent electrodes and a liquid crystal sandwiched between the substrates. The liquid crystal display is enabled for display in a desired manner by applying a predetermined voltage between the transparent electrodes to drive the liquid crystal and to thereby control light transmittance at each pixel. Recently, there is increasing demand for liquid crystal displays, which has diversified requirements for liquid crystal displays. Above all, improvement of display quality is strongly demanded.

Presently, active matrix type liquid crystal displays having a thin film transistor (TFT) at each pixel as a switching element (TFT-LCDs) have become the main stream of the field. In a TFT-LCD, an interval between the two substrates (cell thickness) is maintained by spherical spacers or bar-shaped spacers made of plastic or glass. Such spacers are normally dispersed on either of the substrates at a spacer dispersing step before the substrates are combined. Thereafter, the two substrates are combined and are pressed from the outside such that the cell thickness is maintained at a value similar to the diameter of the spacers.

However, spacers dispersed within a pixel can cause an alignment defect of the liquid crystal and leakage of light. An alignment defect or leakage of light results in a reduction of contract or glare on the display screen, which degrades display quality. Further, increases in the size of substrates have made it difficult to disperse spacers evenly. When spacers are unevenly dispersed, the cell thickness between the substrates can vary to result in irregularities of luminance. Particularly, in the case of an IPS (In-Plane Switching) or MVA (Multi-domain Vertical Alignment) mode liquid crystal display, variation of luminance in response to variation of the cell thickness is more significant than that in a TN (Twisted Nematic) mode liquid crystal display. Therefore, the cell thickness must be controlled to achieve a higher degree of uniformity of the cell thickness in order to provide display without luminance irregularities. Further, since the trend toward pixels of higher definition has resulted in a reduction of the area of each pixel, the area occupied by spacers relative to that of pixels has increased, and spacers have now more significant influence on display quality.

The recent trend toward substrates in greater sizes and pixels of high definition has resulted in the use of pillar spacers made of a photosensitive resin instead of spherical spacers and bar-shaped spacers. Since pillar spacers are formed at a photolithographic step, they can be disposed in a region that is shielded from light with a black matrix (BM) in an arbitrary disposing density. Therefore, neither alignment defect of the liquid crystal nor leakage of light occurs in pixels, there is no reduction in contrast or occurrence of glare. Further, since pillar spacers can be formed with a uniform thickness (height), control can be performed to obtain a uniform and accurate cell thickness between substrates. Therefore, no luminance irregularity attributable to variation of the cell thickness occurs. As thus described, a liquid crystal display utilizing pillar spacers can achieve display characteristics higher than those of a liquid crystal display utilizing spherical spacers or bar-shaped spacers.

FIG. 13 shows a schematic configuration of a liquid crystal display panel utilizing pillar spacers according to the related art. As shown in FIG. 13, the liquid crystal display panel has a TFT substrate 102, a CF substrate 104 and a liquid crystal sealed between the substrates 102 and 104. The liquid crystal display panel also has a display area 140 in which a plurality of pixels are provided. A BM (picture-frame BM) 149 is formed in a picture-frame area outside the display area 140.

FIG. 14 is an enlarged view of the display area 140 on the CF substrate 104 of the liquid crystal display panel according to the related art. As shown in FIG. 14, a plurality of pixels 146 each constituted by three sub-pixels in blue (B), red (R) and green (G) are arranged at a pitch of 297 μm in each of the horizontal and vertical directions of the figure. The CF substrate 104 is also formed with a BM 148 serving as a light shield for regions between adjoining sub-pixels and storage capacitor portions. In the regions shielded from light by the BM 148, a plurality of pillar spacers 150 are disposed in a disposition density of one per three pixels (nine sub-pixels). The disposition density of the pillar spacers 150 is constant throughout the display area 140.

FIG. 15 shows a schematic configuration of a pillar spacer 150. As shown in FIG. 15, the pillar spacer 150 is in the form of a truncated cone having an upper base surface and a lower base surface both of which are circular. The diameter of the upper base surface of the pillar spacer 150 is 10 μm, and the diameter of the lower base surface is 20 μm. All of the pillar spacers 150 in the display area 140 are formed with a substantially constant size.

The amount of compressive displacement of the pillar spacers 150 is designed such that it is uniform in the display area 140. The amount of compressive displacement must be set an optimum value depending on the design of a cell fabrication step. Specifically, after the two substrates are combined and the gap between the substrates is filled with the liquid crystal at a cell fabrication step, the amount of compressive displacement of the pillar spacers 150 is proportionate to the hardness of the liquid crystal display panel. The amount of compressive displacement of the pillar spacers 150 must be designed such that the pillar spacers 150 have both of flexibility sufficient to follow changes in the volume of the liquid crystal attributable to thermal expansion and thermal shrinkage and hardness sufficient to resist pressures from the outside.

When the pillar spacers 150 are too hard, vacuum regions can be formed because the pillar spacers 150 cannot follow a decrease in the volume of the liquid crystal attributable to thermal shrinkage at a low temperature, and bubbles can be generated in such regions. In general, since a sealing material applied to the picture-frame area is quite hard in comparison to the pillar spacers 150, the picture-frame area and the neighborhood of the periphery of the display area are harder than a central region of the display area, and bubbles are more likely to be generated in those regions. At a liquid crystal filling and sealing step utilizing a dip type vacuum filling process, a panel which has been filled with a liquid crystal is pressed from the outside at a predetermined pressure to eject any extra part of the liquid crystal, whereby the cell thickness is adjusted. However, when the pillar spacers 150 are too hard, the pillar spacers 150 cannot be sufficiently shrunk even if they are pressed at the predetermined pressure. Therefore, when the volume of the liquid crystal increases as a result of thermal expansion at a high temperature, the pillar spacers 150 cannot follow the increase in the volume of the liquid crystal. As a result, the liquid crystal is moved toward a lower part of the panel by gravity, and an irregularity is therefore caused by gravity in that the cell thickness becomes greater in the lower part.

When the pillar spacers 150 are too soft, since they undergo a great amount of displacement and also a great amount of plastic deformation in response to a pressure from the outside, an irregularity of the cell thickness can occur.

As a technique for reducing a liquid crystal filling time, the use of the one drop filling (ODF) method is recently spreading, in which substrate combining and liquid crystal filling is performed at the same time. When the one drop filling method is employed, the cell thickness is determined by the amount of the liquid crystal. Therefore, when the amount of the liquid crystal is too large, a gravity-originated irregularity can occur even if the pillar spacers 150 are soft. Conversely, bubbles can be generated in the picture-frame area at a low temperature when the amount of the liquid crystal is too small.

As thus described, there is a problem in that it is difficult to fabricate a liquid crystal display in which no gravity-originated irregularity occurs and no bubble is generated at a low temperature and which exhibits high resistance to pressures from the outside to achieve high display quality.

Patent Document 1: Japanese Patent Laid-Open No. JP-A-2002-182220

Patent Document 2: Japanese Patent Laid-Open No. JP-A-2003-84289

SUMMARY OF THE INVENTION

It is an object of the invention to provide a substrate for a liquid crystal display which allows high display quality to be achieved and a liquid crystal display having the same.

The above-described object is achieved by a substrate for a liquid crystal display, characterized in that it comprises a base substrate sandwiching a liquid crystal in combination with an opposite substrate provided opposite thereto, a pillar spacer formed on the base substrate for maintaining a cell gap between the base substrate and the opposite substrate, a first region where the pillar spacer is compressed in a first amount of compressive displacement when a predetermined pressure is applied to the opposite substrate in a direction perpendicular to a surface of the base substrate, and a second region where the pillar spacer is compressed in a second amount of compressive displacement greater than the first amount of compressive displacement when the predetermined pressure is applied to the opposite substrate.

The invention makes it possible to provide a liquid crystal display which can achieve high display quality.

DESCRIPTION OF THE PREFERRED EMBODIMENTS

[First Mode for Carrying Out the Invention]

Figure 1:
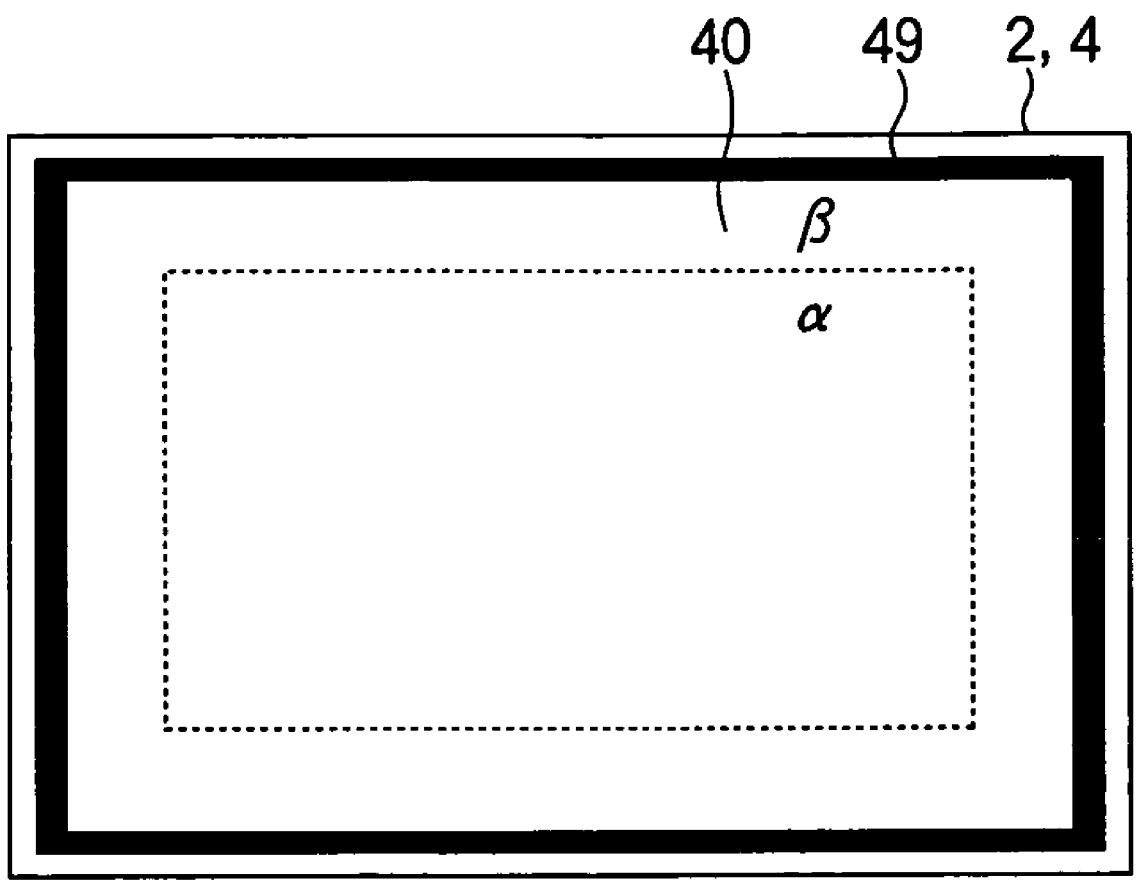
FIG. 1 shows a schematic configuration of a liquid crystal display in a first mode for carrying out the invention.

A description will now be made with reference to FIGS. 1 to 4 on a substrate for a liquid crystal display and a liquid crystal display having the same in a first mode for carrying out the invention. FIG. 1 shows a schematic configuration of the liquid crystal display in the present mode for carrying out the invention. As shown in FIG. 1, the liquid crystal display has a liquid crystal display panel having a TFT substrate 2 and a CF substrate 4 provided opposite to each other and combined with each other with a sealing material interposed between them and a liquid crystal (not shown) sealed between the substrates 2 and 4. The liquid crystal display also has a display area 40 in which a plurality of pixels are provided and a picture-frame area which is provided outside the display area 40 and in which a BM (picture-frame BM) 49 is formed like a frame. The sealing material, which is not shown, is located in the picture-frame area and, for example, outside the BM 49. The display area 40 has two divisions, i.e., a region a near the center of the area and a region β outside the region a and in the neighborhood of the picture-frame area.

Figure 2:
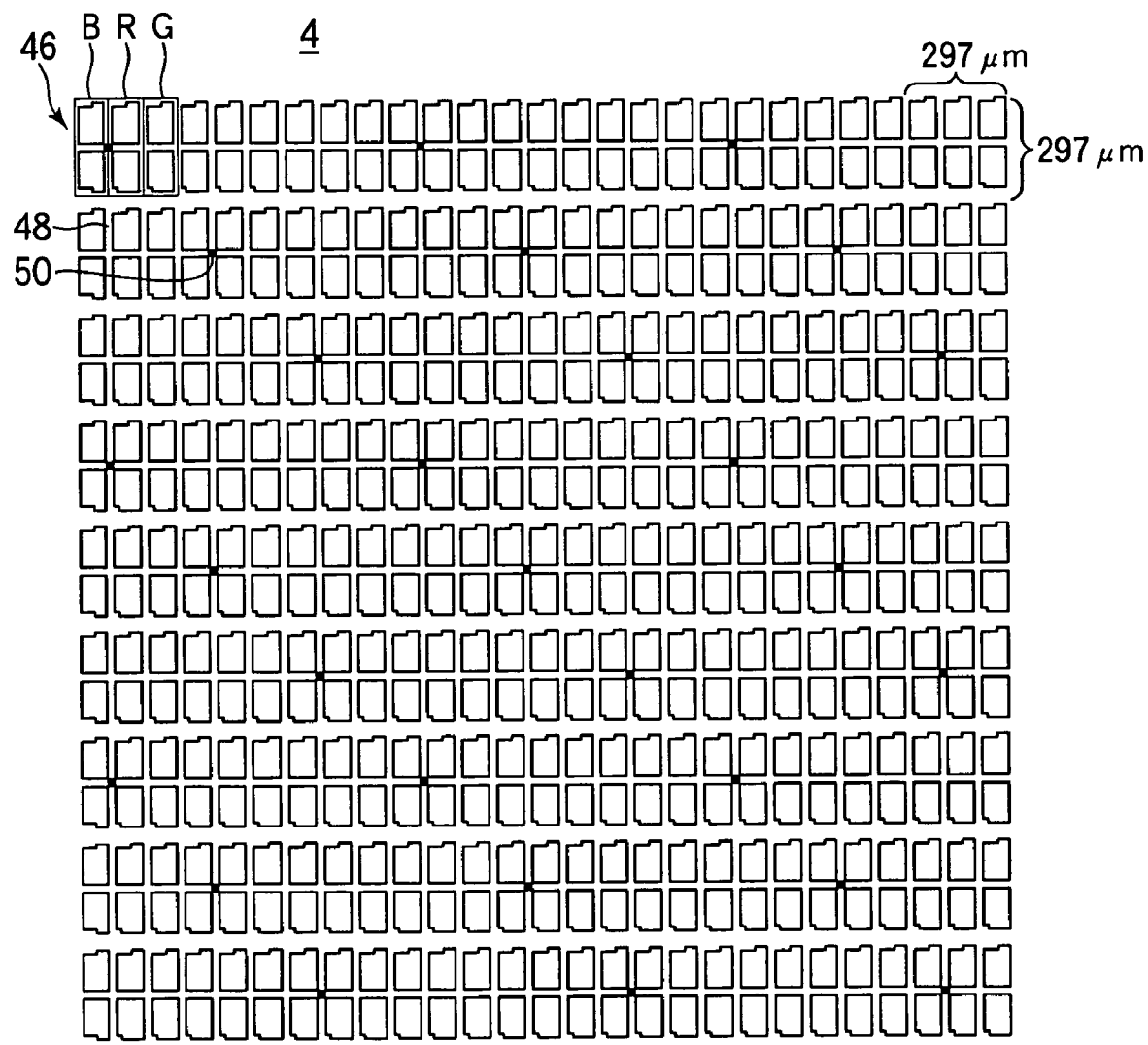
FIG. 2 is an enlarged view of a display area of a substrate for a liquid crystal display in the first mode for carrying out the invention.
Figure 3:
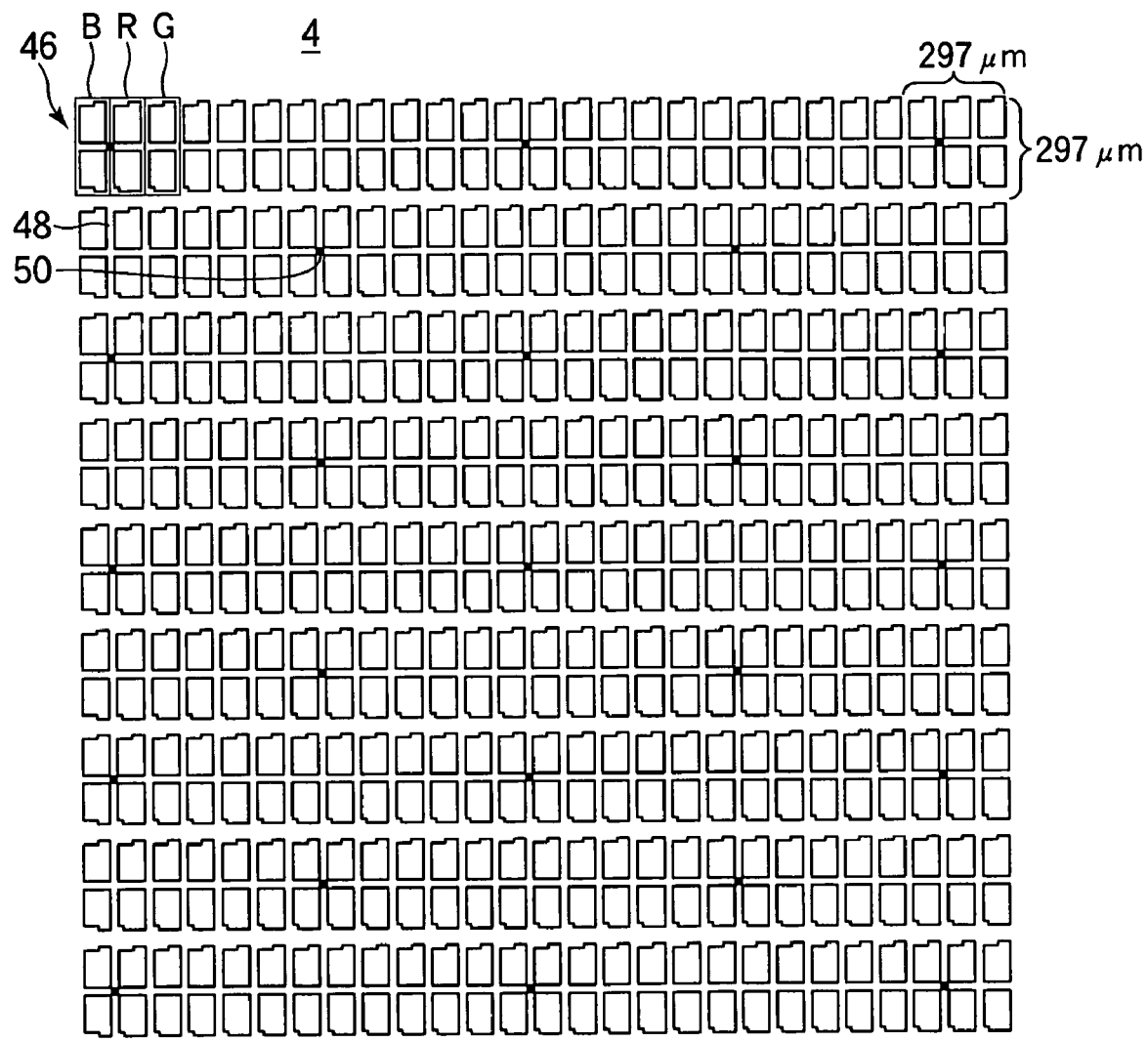
FIG. 3 is an enlarged view of the display area of the substrate for a liquid crystal display in the first mode for carrying out the invention.

FIG. 2 is an enlarged view of the region a of the display area 40 on the CF substrate 4, and FIG. 3 is an enlarged view of the region β of the display area 40 on the CF substrate 4. As shown in FIGS. 2 and 3, in the display area 40, a plurality of pixels 46 each constituted by three sub-pixels in B, R and G are arranged in the form of a matrix at a pitch of 297 μm in each of the horizontal and vertical directions of the figures. A BM 48 serving as a light shield for regions between adjoining sub-pixels and storage capacitor portions is also formed in the display area 40. In the regions shielded from light by the BM 48, a plurality of pillar spacers 50 are disposed in a predetermined disposition density. The disposition density of the pillar spacers 50 in the region a shown in FIG. 2 is one per three pixels (nine sub-pixels). The disposition density of the pillar spacers 50 in the region β shown in FIG. 3 is one per four pixels (twelve sub-pixels) that is lower than the disposition density of the pillar spacers 50 in the region a. The pillar spacers 50 may be formed not only in the display area 40 but also in the picture-frame area.

Figure 4:
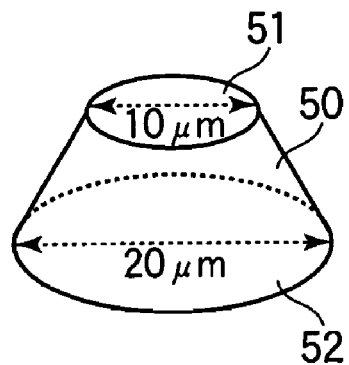
FIG. 4 shows a schematic configuration of a pillar spacer for the substrate for a liquid crystal display in the first mode for carrying out the invention.

FIG. 4 shows a schematic configuration of a pillar spacer 50. As shown in FIG. 4, the pillar spacer 50 is in the form of a truncated cone having an upper base surface 51 and a lower base surface 52 both of which are circular. The diameter of the upper base surface 51 is about 10 μm, and the diameter of the lower base surface 52 is about 20 μm. All of the pillar spacers 50 in the display area 40 are formed in substantially the same shape and substantially the same size. For example, the upper base surface 51 is in contact with a surface of the TFT substrate, and the lower base surface 52 is in contact with a surface of the CF substrate. A supporting area over which one pillar spacer 50 supports the substrates to maintain a cell gap between them is equal to the area of the upper base surface 51. The areal density of the pillar spacers 50 (=(the disposition density of the pillar spacers 50)×(the supporting area of each of the pillar spacers 50)) D1 in the region a is higher than the areal density D2 of the pillar spacers 50 in the region β (D1>D2). Therefore, when a predetermined pressure in a direction perpendicular to the substrate surface is uniformly applied between the substrates, pillar spacers 50 in the region α are compressed in an amount Z1 of compressive displacement which is smaller than an amount Z2 of compressive displacement of pillar spacers 50 in the region β if the influence of the sealing material is neglected (Z1<Z2).

In the present mode for carrying out the invention, the pillar spacers 50 are disposed in a relatively high areal density D1 in the region α in the neighborhood of the center of the display area 40, and the pillar spacers 50 are disposed in a relatively low area density D2 in the region β in the neighborhood of the picture-frame area which is under the influence of the sealing material that is harder than the pillar spacers 50. As a result, in the liquid crystal display panel formed by combining the two substrates with the sealing material interposed between them, the amounts of compressive displacement of the pillar spacers 50 in the neighborhood of the center of the display area 40 and the neighborhood of the picture-frame area are similar to each other, and the pillar spacers 50 can follow a decrease in the volume of the liquid crystal at a low temperature. It is therefore possible to obtain liquid crystal displays with a wide manufacture margin and high reliability at low temperatures.

In the present mode for carrying out the invention, since the amount of compressive displacement of the pillar spacers 50 is varied by forming the pillar spacers 50 in different disposition densities in the regions α and β using a photolithographic process, there is no increase in the number of steps for manufacturing a liquid crystal display. In the present mode for carrying out the invention, it is therefore possible to obtain a low cost liquid crystal display which is less vulnerable to the influence a temperature change and which is highly reliable.

The supporting area of each pillar spacer 50 may be made different between the regions α and β to provide the pillar spacers 50 with different areal densities in the regions α and β. In this case again, there will be no increase in the number of steps for manufacturing a liquid crystal display. The amount of compressive displacement of the pillar spacers 50 may be varied by forming the pillar spacers 50 from different materials in the regions α and β instead of varying the areal density of the pillar spacers 50.

Embodiment 1-1

A liquid crystal display according to Embodiment 1-1 in the present mode for carrying out the invention will now be described. A CF substrate was fabricated by forming color filter layers in respective colors R, G and B, and a common electrode on a glass substrate and thereafter forming a plurality of pillar spacers 50 in the form of a truncated cone having an upper base surface 51 with a diameter of 10 μm and a lower base surface 52 with a diameter of 20 μm as shown in FIG. 4. The disposition density of the pillar spacers 50 was one per three pixels (nine sub-pixels) in a region a in the neighborhood of the center of a display area 40 and one per four pixels (twelve sub-pixels) in a region β in the neighborhood of a picture-frame area. Thereafter, an alignment film was formed on a surface of the CF substrate and on a surface of a TFT substrate which was fabricated at a separate step. Subsequently, steps such as rubbing, sealing material application, substrate combining, panel cutting, liquid crystal filling, polarizer attaching and the like were performed to fabricate a liquid crystal display panel. The liquid crystal panel was an XGA class panel having a diagonal dimension of 15 inches and a pixel pitch of 297 μm in the display area thereof. Thereafter, a liquid crystal display of the present embodiment was completed through a module fabrication step. The areal density of the pillar spacers 50 of the liquid crystal display of the present embodiment was different between the neighborhood of the center of the display area 40 and the neighborhood of the picture-frame area. Since this allowed the pillar spacers 50 to follow a decrease in the volume of the liquid crystal at a low temperature, no bubble was generated, and high display quality could be achieved.

While the display area 40 is divided into the two regions α and β in which the pillar spacers 50 are formed in different areal densities in the present embodiment, it may alternatively be divided into three or more regions. However, it should be noted that a difference between amounts of compressive displacement of the pillar spacers 50 becomes too large and visually perceptible as a cell thickness irregularity on the display screen when there is excessive variation of the areal density of the pillar spacers 50 between the regions. The optimum areal density of the pillar spacers 50 in the neighborhood of the picture-frame area depends on the distance from the sealing material to the display area 40. The influence of the sealing material becomes more significant, the smaller the distance. Therefore, consideration must be paid in this regard when designing the pillar spacers 50.

[Second Mode for Carrying Out the Invention]

A description will now be made with reference to FIGS. 5 to 12 on a substrate for a liquid crystal display and a liquid crystal display having the same in a second mode for carrying out the invention. When a liquid crystal display is used as a monitor of a personal computer or a television receiver, the liquid crystal display is used in an upright position such that the display screen will be substantially in parallel with the vertical direction. In the substrate for a liquid crystal display in the present mode for carrying out the invention, the areal density of pillar spacers 50 in a region located in a lower part of the liquid crystal display is lower than the areal density of pillar spacers 50 in a region located in a higher part when the display is erected in the vertical direction. As a result, when a liquid crystal is injected, the amount of compressive displacement of the pillar spacers 50 in the lower part of the display area is greater than that in the upper part of the display area. Therefore, even when there is an increase in the volume of the liquid crystal at a high temperature, since the pillar spacers 50, especially, in the lower part of the display area can sufficiently follow the increase in volume, the occurrence of a gravity-originated irregularity can be suppressed at the high temperature. Therefore, in the present mode for carrying out the invention, a liquid crystal display can be obtained which has a wide margin of manufacture and which is highly reliable at high temperatures.

Embodiment 2-1

Figure 5:
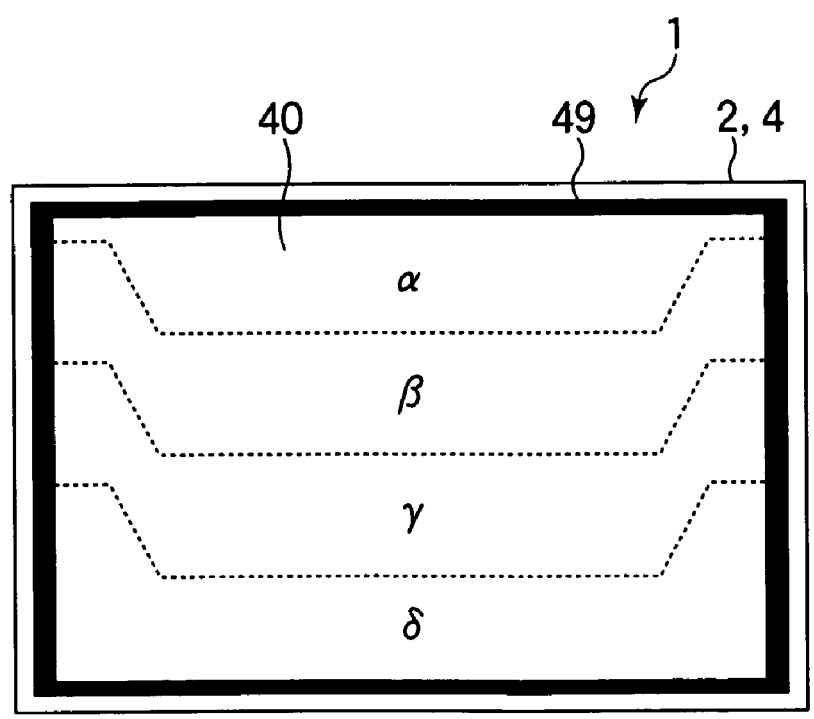
FIG. 5 shows a schematic configuration of a liquid crystal display according to Embodiment 2-1 in a second mode for carrying out the invention.
Figure 6A:
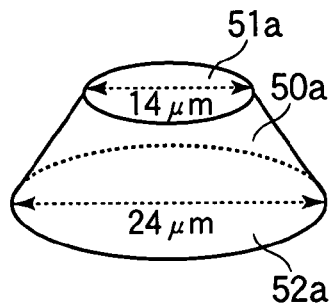
FIGS. 6A to 6D show schematic configurations of pillar spacers for a substrate for a liquid crystal display according to Embodiment 2-1 in the second mode for carrying out the invention.
Figure 6B:
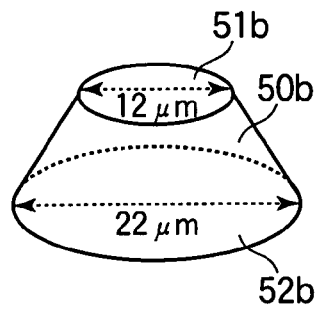
Figure 6C:
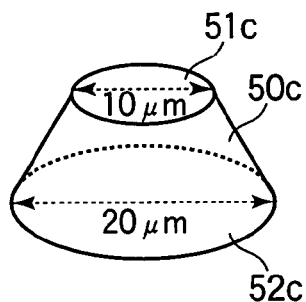
Figure 6D:
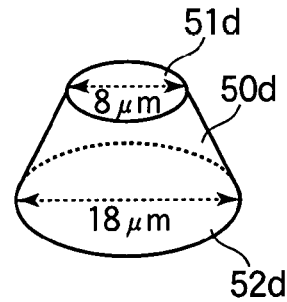

A liquid crystal display according to Embodiment 2-1 in the present mode for carrying out the invention will be described. FIG. 5 shows a schematic configuration of the liquid crystal display of the present embodiment, and FIGS. 6A to 6D show schematic configurations of pillar spacers 50. As shown in FIG. 5, a display area 40 is divided into four regions α, β, γ and δ which are arranged in the order listed in the top-to-bottom direction of the display area when the liquid crystal is erected. Pillar spacers 50a in the form of a truncated cone having an upper base surface 51a with a diameter of 14 μm and a lower base surface 52a with a diameter of 24 μm are formed in the uppermost region α as shown in FIG. 6A. Pillar spacers 50b in the form of a truncated cone having an upper base surface 51b with a diameter of 12 μm and a lower base surface 52b with a diameter of 22 μm are formed in the region β under the region a as shown in FIG. 6B. Pillar spacers 50c in the form of a truncated cone having an upper base surface 51c with a diameter of 10 μm and a lower base surface 52c with a diameter of 20 μm are formed in the region γ under the region β as shown in FIG. 6C. Pillar spacers 50d in the form of a truncated cone having an upper base surface 51d with a diameter of 8 μm and a lower base surface 52d with a diameter of 18 μm are formed in the lowermost region δ as shown in FIG. 6D. The pillar spacers 50a to 50d are substantially equal in height. The pillar spacers 50a to 50d in the regions α to δ are all disposed in a density of one per three pixels (nine sub-pixels). A relationship expressed by D1>D2>D3>D4 is satisfied where D1 represents the areal density of the pillar spacers 50a in the region α; D2 represents the areal density of the pillar spacers 50b in the region β; D3 represents the areal density of the pillar spacers 50c in the region γ; and D4 represents the areal density of the pillar spacers 50d in the region δ.

When the pillar spacers 50 cannot follow an increase in the volume of the liquid crystal, the liquid crystal tends not only to be moved downward by gravity but also to be moved toward a picture-frame area. For this reason, each of the boundaries between the regions α to δ in the present embodiment does not extend in the form of a straight line in the horizontal direction but extends diagonally and upward in the neighborhood of the picture-frame area to suppress the movement of the liquid crystal toward the picture-frame area. While the display area 40 is divided into the four regions α to δ between which the areal density of the pillar spacers 50 is varied in the present embodiment, the area may be divided into two, three, or five or more regions.

Figure 7A:
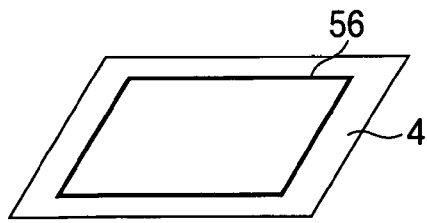
FIGS. 7A to 7C show a method of manufacturing the liquid crystal display according to Embodiment 2-1 in the second mode for carrying out the invention.
Figure 7B:
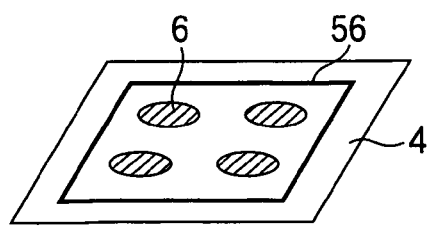
Figure 7C:
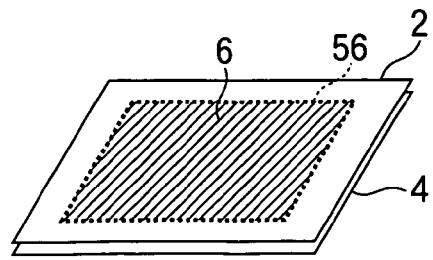

A method of manufacturing a liquid crystal display according to the present embodiment will now be described. FIGS. 7A to 7C show the method of manufacturing a liquid crystal display according to the present embodiment. After color filter layers in colors R, G and B, a common electrode and protrusions for alignment regulation were formed on a glass substrate, pillar spacers 50a to 50d were formed in respective regions α to δ in a display area to fabricate a CF substrate 4. Thereafter, an alignment film was formed on a surface of the CF substrate and a surface of a TFT substrate which was fabricated at a separate step. Next, as shown in FIG. 7A, a sealing material 56 was applied to a peripheral part of the CF substrate 4 (or the TFT substrate) without discontinuity of the material. Next, as shown in FIG. 7B, a predetermined amount of negative liquid crystal was dropped on a plurality of locations on the CF substrate 4 (or the TFT substrate). As shown in FIG. 7C, the TFT substrate 2 and the CF substrate 4 were then combined together in vacuum; the gap between the substrates 2 and 4 was filled with the liquid crystal 6 by restoring them to the atmospheric pressure; and the sealing material 56 was thereafter cured. Subsequently, steps such as panel cutting and polarizer application were performed to fabricate an MVA type liquid crystal display panel. The liquid crystal display panel was an SXGA class panel having a diagonal dimension of 19 inches and a pixel pitch of 294 μm in the display area. Thereafter, a module fabrication step was performed to complete a liquid crystal display according to the present embodiment. In the liquid crystal display of the present embodiment, the pillar spacers 50 are disposed in a high areal density in an upper part of the display area, and the pillar spacers 50 are disposed in a lower areal density in a lower part of the display area. No gravity-originated irregularity occurred in the liquid crystal display of the present embodiment because the pillar spacers 50 could follow an increase in the volume of the liquid crystal at a high temperature (on the order of 60° C.), which allowed high image quality to be achieved.

Figure 8A:
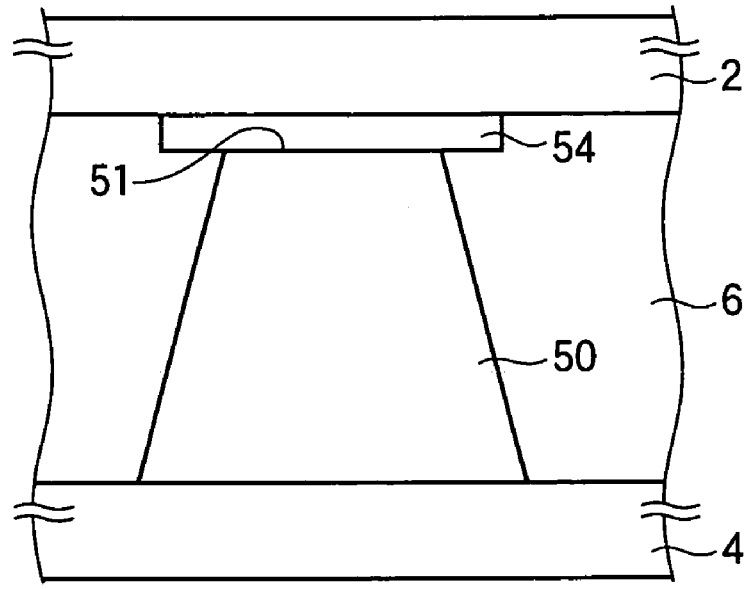
FIGS. 8A and 8B shows a modification of the configuration of the liquid crystal display according to Embodiment 2-1 in the second mode for carrying out the invention.
Figure 8B:
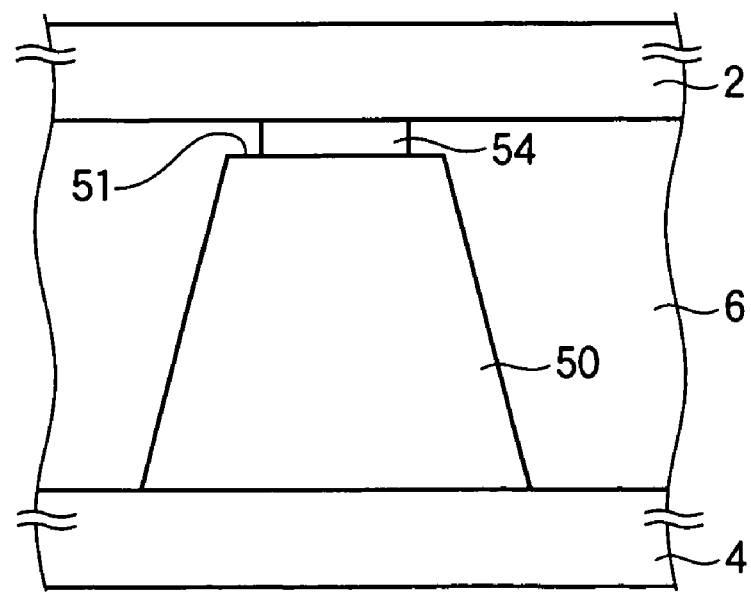

FIGS. 8A and 8B show a modification of the configuration of the liquid crystal display of the present embodiment. FIG. 8A shows a sectional configuration of the neighborhood of a pillar spacer 50 in the region a shown in FIG. 5, and FIG. 8B shows a sectional configuration of the neighborhood of a pillar spacer 50, for example, in the region δ. As shown in FIGS. 8A and 8B, in the present modification, the pillar spacers 50 in the regions α to δ of the display area are in substantially the same shape and size and are formed on the CF substrate 4 in a substantially uniform disposition density. On the TFT substrate 2 provided opposite to the CF substrate 4, structures 54 having a substantially uniform height are formed in positions associated with the respective pillar spacers 50. The structures 54 are in contact with the upper base surfaces 51 of the pillar spacers 50. For example, structures 54 in the region a are patterned to have a width greater than the upper base surface 51 of a pillar spacer 50, and structures 54 in the regions β, γ and δ are patterned to have a width smaller than the upper base surface 51 of a pillar spacer 50. The structures 54 in the region γ have a width smaller than that of the structures 54 in the region β, and the structures 54 in the region δ have a width smaller than that of the structures 54 in the region γ. The supporting area of each of the pillar spacers 50 is equal to the area of contact between upper base surface 51 and the structure 54. In the present modification, the size (width) of the structures 54 is varied between the regions to vary the supporting area of the pillar spacers 50 between the regions. The amount of compressive displacement of the pillar spacers 50 may be varied between the regions in such a manner. Instead of varying the areal density of the pillar spacers 50, the pillar spacers 50 may be formed from a different material in each of the regions α to δ to vary the amount of compressive displacement of the pillar spacers 50.

Embodiment 2-2

Figure 9:
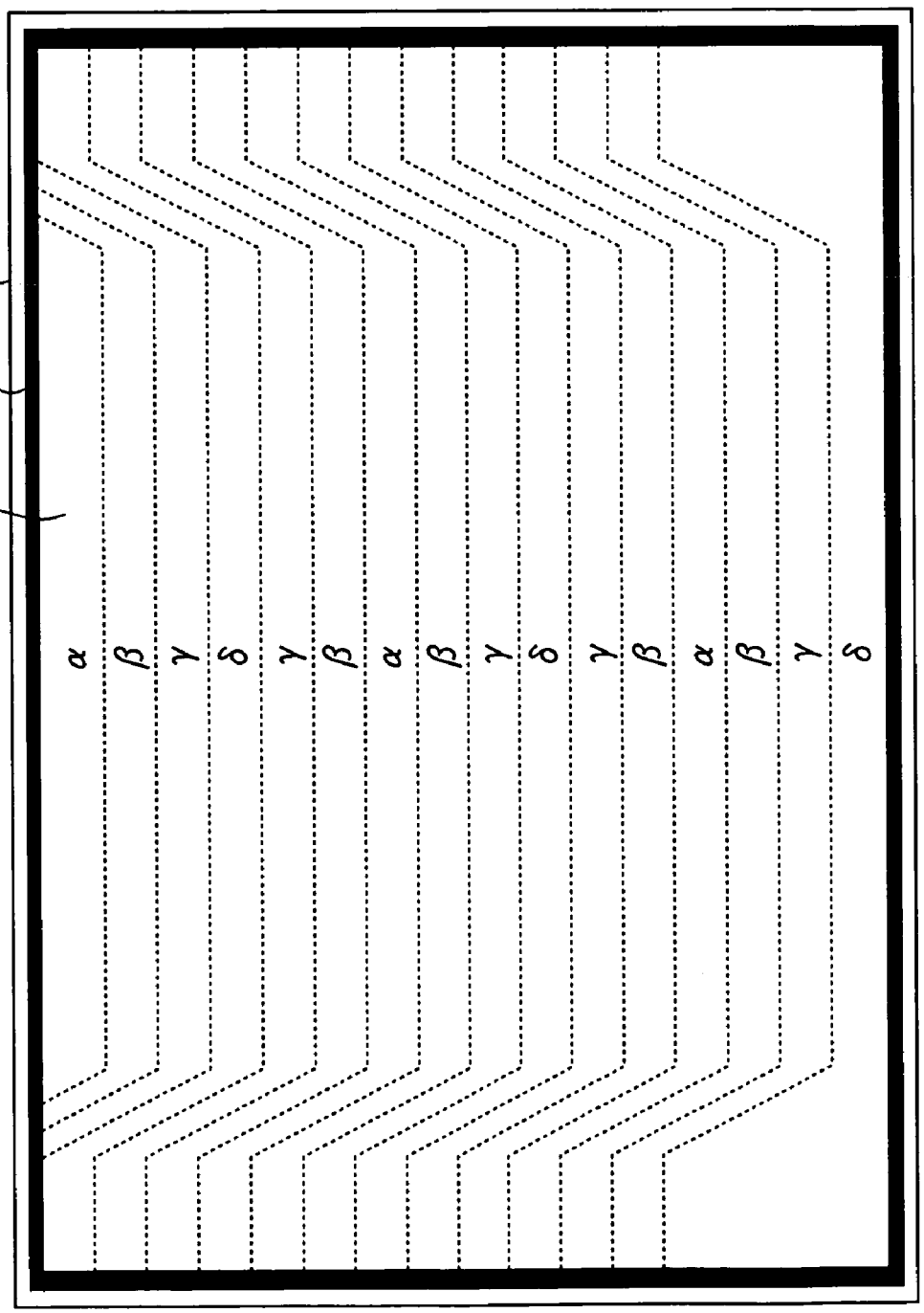
FIG. 9 is a sectional view of a liquid crystal display according to Embodiment 2-2 in the second mode for carrying out the invention showing a schematic configuration thereof.

A liquid crystal display according to Embodiment 2-2 in the present mode for carrying out the invention will now be described. FIG. 9 shows a schematic configuration of the liquid crystal display of the present embodiment. As shown in FIG. 9, a display area 40 is divided into sixteen regions α, β, γ, δ, γ, β, α, . . . , α, β, γ and β which are arranged in the order listed in the top-to-bottom direction of the liquid crystal panel when the panel is erected. Pillar spacers 50a to 50d similar to those in Embodiment 2-1 are formed in the regions α to δ, respectively. In the case of a liquid crystal display having a large-sized screen, when the screen is divided into four regions as shown in FIG. 5, a region δ in which pillar spacers 50 undergo a great compressive displacement will have a great area, and an irregularity in the cell thickness will be more apt to occur. Therefore, in the liquid crystal display having a large-sized screen, the region δ is preferably distributed as shown in FIG. 9.

Figure 10:
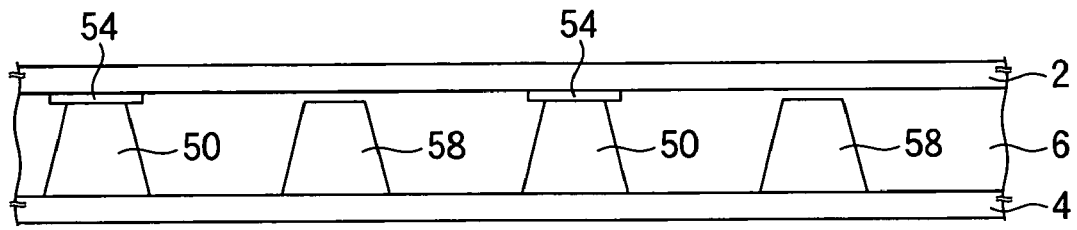
FIG. 10 shows a configuration of a pillar spacer for the liquid crystal display according to Embodiment 2-2 in the second mode for carrying out the invention.
Figure 11A:
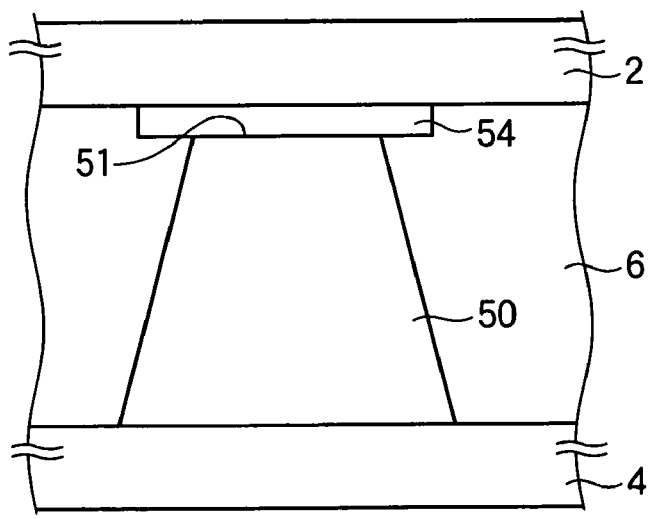
FIGS. 11A and 11B show configurations of pillar spacers for the liquid crystal display according to Embodiment 2-2 in the second mode for carrying out the invention.
Figure 11B:
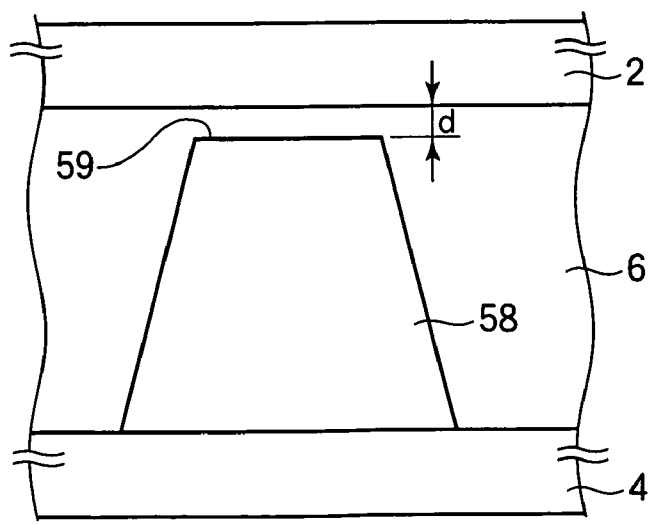

FIG. 10 is a sectional view of a pillar spacer in the liquid crystal display of the present embodiment showing a schematic configuration of the same. As shown in FIG. 10, in the present embodiment, structures 54 are formed in part of a TFT substrate 2. As a result, there are pillar spacers 50 which are formed in positions associated with the structures 54 and which are in contact with both of substrates 2 and 4 and sub pillar spacers 58 which are formed in positions other than the positions associated with the structures 54 and which are in contact with the CF substrate 4 only. FIG. 11A shows a configuration of a pillar spacer 50, and FIG. 11B shows a configuration of a sub pillar spacer 58. As shown in FIGS. 11A and 11B, an upper base surface 51 of the pillar spacer 50 is in contact with a structure 54 on the TFT substrate 2, whereas an upper base surface 59 of the sub pillar spacer 58 formed in a position other than the positions associated with the structures 54 faces the TFT substrate 2 with a predetermined gap d left between them.

Figure 12:
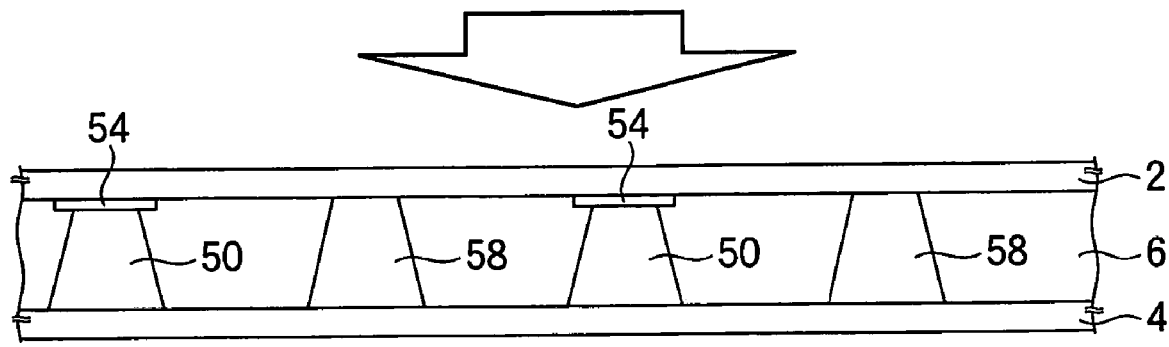
FIG. 12 is a sectional view of a liquid crystal display showing a configuration thereof when a pressure is applied thereto from the outside.
Figure 13:
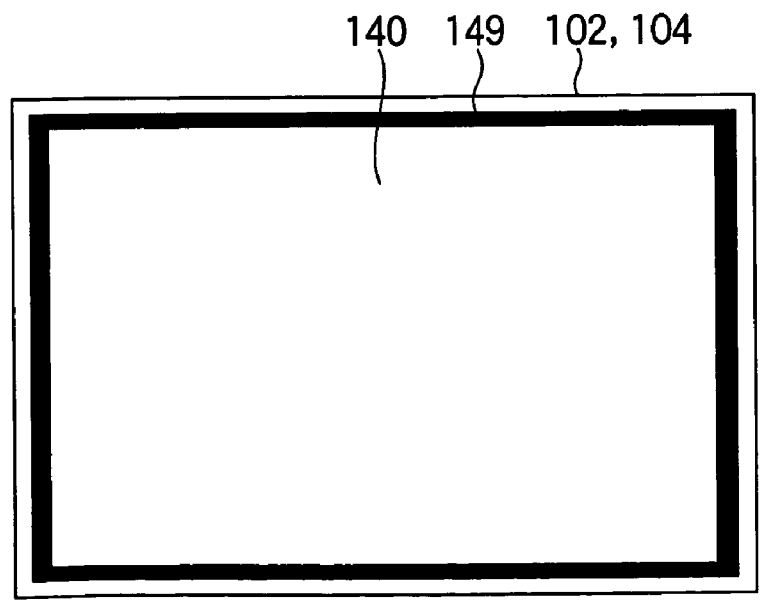
FIG. 13 shows a schematic configuration of a liquid crystal display panel according to the related art.
Figure 14:
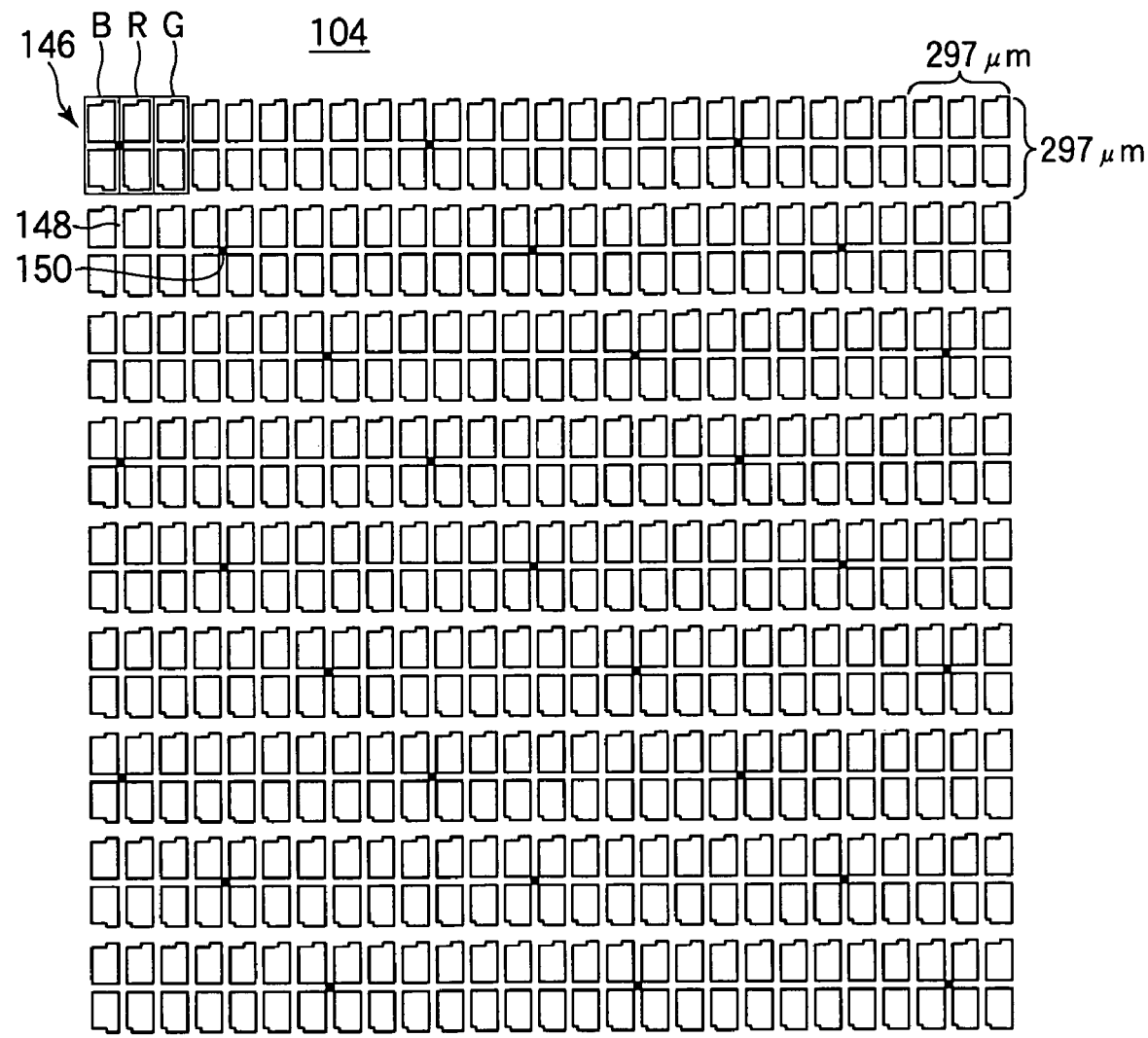
FIG. 14 is an enlarged view of a display area of the liquid crystal display panel according to the related art.
Figure 15:
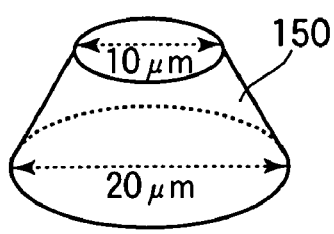
FIG. 15 shows a schematic configuration of a pillar spacer for the liquid crystal display panel according to the related art.

FIG. 12 shows a state in which a relatively great pressure is applied to the TFT substrate 2 from the outside. As shown in FIG. 12, when the great pressure (which is indicated by the thick arrow in the figure) is applied, the pillar spacers 50 are compressed, and the sub pillar spacers 58 come into contact with the TFT substrate 2. In the present embodiment, since the cell gap is maintained only by the pillar spacers 50 which is in a relatively low areal density when no pressure is applied from the outside, it is possible to suppress occurrence of an irregularity due to gravity or generation of bubbles at a low temperature. Since the cell gap is maintained by both of the pillar spacers 50 and the sub pillar spacers 58 when a pressure is applied from the outside, a high anti-pressure property can be obtained. As a result, at manufacturing steps for a liquid crystal display using the ODF method in which it is generally difficult to adjust the height of pillar spacers 50 and the amount of the liquid crystal, it is possible to achieve two advantages contradictory to each other, i.e., a wide margin of manufacture and a high anti-pressure property.

A method of manufacturing a liquid crystal display according to the present embodiment will now be described. After color filter layers in colors R, G and B, a common electrode and protrusions for alignment regulation were formed on a glass substrate, pillar spacers 50a to 50d were formed in respective regions α to δ in a display area to fabricate a CF substrate 4. Thereafter, an alignment film was formed on a surface of the CF substrate 4 and a surface of a TFT substrate 2 which was fabricated at a separate step. Next, a sealing material 56 was applied to a peripheral part of the CF substrate 4 (or the TFT substrate 2) without discontinuity of the material. Next, a predetermined amount of negative liquid crystal was dropped on a plurality of locations on the CF substrate 4 (or the TFT substrate 2). The TFT substrate 2 and the CF substrate 4 were then combined together in vacuum; the gap between the substrates 2 and 4 was filled with the liquid crystal 6 by restoring them to the atmospheric pressure; and the sealing material 56 was thereafter cured. Subsequently, steps such as panel cutting and polarizer application were performed to fabricate an MVA type liquid crystal display panel. The liquid crystal display panel was a WXGA class panel having a diagonal dimension of 30 inches and a pixel pitch of 502.5 μm in the display area. Thereafter, a module fabrication step was performed to complete a liquid crystal display according to the present embodiment. According to the present embodiment, no gravity-originated irregularity occurred even in a liquid crystal display having a large-sized screen because the pillar spacers 50 could follow an increase in the volume of the liquid crystal at a high temperature (on the order of 60° C.), which allowed high image quality to be achieved.

The invention is not limited to the above-described modes for carrying out the same and may be modified in various ways.

For example, while liquid crystal displays having color filters formed on a substrate 4 provided opposite to a TFT substrate 2 have been shown by way of example in the above-described modes for carrying out the invention, the invention is not limited to them and may be applied to liquid crystal displays having the so-called CF-on-TFT structure in which color filters are formed on a TFT substrate 2.

What is claimed is:

1. A substrate for a liquid crystal display, comprising:
   a base substrate sandwiching a liquid crystal in combination with an opposite substrate provided opposite thereto;
   a pillar spacer formed on the base substrate for maintaining a cell gap between the base substrate and the opposite substrate;
   a first region in a display area where the pillar spacer is compressed in a first amount of compressive displacement when a predetermined pressure is applied to the opposite substrate in a direction perpendicular to a surface of the base substrate; and
   a second region in a display area where the pillar spacer is compressed in a second amount of compressive displacement greater than the first amount of compressive displacement when the predetermined pressure is applied to the opposite substrate,
   wherein the second region is provided outside the first region, and
   the areal density of the pillar spacer in the second region is lower than the areal density of the pillar spacer in the first region.

2. A substrate for a liquid crystal display according to claim 1, wherein the first region is provided in the neighborhood of the center of a display area, and the second region is provided in the neighborhood of a picture-frame area.

3. A substrate for a liquid crystal display according to claim 1, wherein the density of disposition of the pillar spacer in the second region is lower than the density of disposition of the pillar spacer in the first region.

4. A substrate for a liquid crystal display according to claim 1, wherein an area supported by the pillar spacer in the second region is smaller than an area supported by the pillar spacer in the first region.

5. A substrate for a liquid crystal display according to claim 1, wherein the pillar spacer in the first region and the pillar spacer in the second region are formed of materials different from each other.

6. A substrate for a liquid crystal display according to claim 1, further comprising a sub pillar spacer facing the opposite substrate with a predetermined gap left between them and contacting the opposite substrate when a pressure is applied from the outside.

7. A substrate for a liquid crystal display comprising:
a base substrate sandwiching a liquid crystal in combination with an opposite substrate provided opposite thereto;
a pillar spacer formed on the base substrate for maintaining a cell gap between the base substrate and the opposite substrate;
a first region in a display area where the pillar spacer is compressed in a first amount of compressive displacement when a predetermined pressure is applied to the opposite substrate in a direction perpendicular to a surface of the base substrate; and
a second region in a display area where the pillar spacer is compressed in a second amount of compressive displacement greater than the first amount of compressive displacement when the predetermined pressure is applied to the opposite substrate,
wherein
the display area includes a plurality of pixels,
the first region and the second region include different pixels from each other,
the second region is only located lower than the first region when the substrate is erected in a vertical direction, and
the areal density of the pillar spacer in the second region is lower than the areal density of the pillar spacer in the first region.

8. A liquid crystal display comprising:
a pair of substrates provided opposite to each other and a liquid crystal sealed between the pair of substrates,
wherein one of the pair of substrates includes:
a pillar spacer formed on a base substrate for maintaining a cell gap between the base substrate and an opposite substrate;
a first region in a display area where the pillar spacer is compressed in a first amount of compressive displacement when a predetermined pressure is applied to the opposite substrate in a direction perpendicular to a surface of the base substrate; and
a second region in a display area where the pillar spacer is compressed in a second amount of compressive displacement greater than the first amount of compressive displacement when the predetermined pressure is applied to the opposite substrate,
wherein the second region is provided outside the first region, and
the areal density of the pillar spacer in the second region is lower than the areal density of the pillar spacer in the first region.

9. A liquid crystal display according to claim 8, further comprising a sealing material applied to a peripheral part of either of the pair of substrates without discontinuity.

* * * * *